US012794031B2

(12) United States Patent
Li et al.

(10) Patent No.: US 12,794,031 B2
(45) Date of Patent: Nov. 10, 2026

(54) METHOD OF TARGETED RECYCLING OF WASTE BATTERIES

(71) Applicant: TSINGHUA UNIVERSITY, Beijing (CN)

(72) Inventors: Jinhui Li, Beijing (CN); Jiadong Yu, Beijing (CN); Lili Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 377 days.

(21) Appl. No.: 18/583,590

(22) Filed: Feb. 21, 2024

(65) Prior Publication Data

US 2025/0149667 A1 May 8, 2025

(30) Foreign Application Priority Data

Nov. 8, 2023 (CN) ......................... 202311482324.9

(51) Int. Cl.
*C22B 1/24* (2006.01)
*B22F 9/04* (2006.01)
(Continued)

(52) U.S. Cl.
CPC ............... *H01M 10/54* (2013.01); *B22F 9/04* (2013.01); *B22F 9/30* (2013.01); *C22B 1/24* (2013.01);
(Continued)

(58) Field of Classification Search
CPC ......... C22B 1/24; C22B 23/005; C22B 23/02; C22B 26/12; C22B 7/00; C22B 7/001;
(Continued)

(56) References Cited

U.S. PATENT DOCUMENTS

2014/0147586 A1* 5/2014 Liang .................. H01M 4/5825 252/182.1

FOREIGN PATENT DOCUMENTS

CN 114094219 A * 2/2022 ............ H01M 10/54

OTHER PUBLICATIONS

NPL: on-line translation of CN 114094219 A, Feb. 2022 (Year: 2022).*

* cited by examiner

*Primary Examiner* — Jie Yang
(74) *Attorney, Agent, or Firm* — Platinum Intellectual Property PC

(57) ABSTRACT

The invention provides a targeted recycling method for waste battery, which comprises the following steps: the positive electrode strip of the waste battery is broken to obtain the broken product; In a carbon monoxide atmosphere, the broken product is pyrolyzed to obtain the pyrolysis product, and then the pyrolysis product is magnetically separated to obtain the magnetic separation product to achieve valuable metal recovery; The pyrolysis gas of the pyrolysis is passed into an alkaline solution to obtain a Li-rich solution and realize Li recovery. The method induces the directional transfer of solid oxygen in the waste cathode material through pyrolysis to form a coexistence environment of Co and $Al_2O_3$, effectively inhibits the high temperature alloying, and at the same time, the high temperature complex reaction of CO and the newborn Co particle is used to induce the targeted aggregation of cobalt nanoparticles against the concentration gradient of CO to form millimeter-sized particles, so as to realize magnetic separation and recovery. At the same time, the method of the invention can realize industrial application.

8 Claims, 2 Drawing Sheets

(51) Int. Cl.

| | |
|---|---|
| ***B22F 9/30*** | (2006.01) |
| ***C22B 7/00*** | (2006.01) |
| ***C22B 23/00*** | (2006.01) |
| ***C22B 23/02*** | (2006.01) |
| ***C22B 26/12*** | (2006.01) |
| ***H01M 10/54*** | (2006.01) |

(52) U.S. Cl.
CPC .............. *C22B 7/001* (2013.01); *C22B 7/008* (2013.01); *C22B 23/005* (2013.01); *C22B 23/02* (2013.01); *C22B 26/12* (2013.01); *B22F 2301/15* (2013.01); *B22F 2998/10* (2013.01)

(58) Field of Classification Search
CPC ..... C22B 7/005; C22B 7/008; B22F 2301/15; B22F 2998/10; B22F 9/04; B22F 9/30; C22C 1/0408; H01M 10/54; Y02W 30/84
See application file for complete search history.

METHOD OF TARGETED RECYCLING OF WASTE BATTERIES

RELATED APPLICATIONS

This application is a Non-provisional Application under 35 USC § 111(a), which claims priority to Chinese Patent Application No. 202311482324.9, filed Nov. 8, 2023, the disclosure of all of which is hereby incorporated by reference in its entirety.

TECHNICAL FIELD

The invention belongs to the technical field of pyrometallurgy or resource recovery of waste lithium batteries, and relates to a method of targeting recovery of waste batteries.

BACKGROUND TECHNOLOGY

The present invention belongs to the technical field of pyrometallurgy or resource recovery of waste lithium batteries, and relates to a method of targeting recovery of waste batteries.

Currently, electrification of the transport industry is considered an important step to effectively reduce carbon emissions as well as to stop global warming. A lithium battery is a key component of an electric vehicle, and bears part or all of the power output of the electric vehicle. However, the limited cycle life of Li-ion batteries and their fast replacement rate result in a large number of retired power batteries every year.

With the rapid depletion of global strategic mineral resources of Li and Co metals, in-depth recovery of valuable metals in retired power batteries will significantly extend their life cycle process. At present, the existing technology of waste lithium battery recycling has been formed to metallurgical chemistry technology, it is expected that 90% of the global waste lithium battery will enter the wet and pyrometallurgical system for recycling. Compared with wet metallurgy recycling, pyrometallurgical technology has the advantages of short process, simple and reliable equipment, low operating cost and no wastewater discharge, which is the main recycling technology route of existing recycling enterprises.

For the recovery of lithium batteries, CN 109719117A discloses a method of pyrolysis in the process of recycling and treatment of waste lithium batteries, whereby the waste battery core is wrapped with a mixture of fire extinguishing sand and conductive carbon black after the shell is removed, and the wrapped battery is placed in an airtight container with $CO_2$ or $CO_2$-containing mixed gases or under a vacuum atmosphere, and the airtight container is then placed in a light wave furnace and adjusted to the light wave microwave combination heating gear After heating for 5-500 seconds; after cooling down, the electric core is taken out, crushed and sieved, and electrode material powder and Cu/Al foil are obtained; it provides a carbothermal reduction roasting method using conductive carbon black as a reducing agent, and further improves the thermal efficiency by means of combined light-wave and microwave heating, and the final products are electrode material powder and Cu/Al foil.

CN 111834683A discloses a recycling method for waste $LiCoO_2$ batteries, step 1, carrying out biomass pyrolysis of waste $LiCoO_2$ batteries to obtain a mixture of Co powder and lithium oxide; step 2, crushing as well as sorting of said mixture of step 1 to obtain plastics, Fe, Al foils, Cu foils, and positive and negative electrode powders; step 3, carrying out slurry washing of said positive and negative electrode powders of step 2, filtering and separation, obtaining a lithium carbon hydroxide solution and a carbon-containing Co powder; step 4, reacting said LiOH solution of step 3 with HCl, obtaining LiCl; mixing and reacting the carbon-containing Co powder of said step 3 with $H_2SO_4$, and then concentrating and crystallizing thereafter, obtaining $CoSO_4$ crystals, and completing the recycling of the waste $LiCoO_2$ batteries; this provides for the biomass pyrolysis of waste $LiCoO_2$ batteries, obtaining a mixture of Co powder and $Li_2O$; namely, which is to obtain plastic, Fe, Al foil, Cu foil and positive and negative electrode powders after crushing as well as sorting the mixture; and to obtain LiCl and $CoSO_4$ step by step by carrying out slurry washing, HCl reaction and $H_2SO_4$ leaching on the positive and negative electrode powders.

CN 109652654A discloses a method for resource recovery of metal elements from waste ternary power lithium batteries, in which the waste lithium battery crushing product is immersed in water, and then pyrolysis at high temperature in a $CO_2$ atmosphere is carried out; the pyrolysis product is then given to acid leaching, extraction, and ammonia complexation to prepare ternary composite hydroxide.

However, all of the above methods use pyrolysis to volatilize and remove the electrolyte, and further use the organic impurities inherent in the waste lithium battery as a carbon source, or drum in the $CO_2$ gas, through the principle of carbothermal reduction, to achieve the reduction and degradation of the waste lithium battery transition metal oxides cathode materials. However, the pyrolysis product of waste lithium battery Li—Al-transition metal elements embedded in complex, tight atomic connection, difficult to meet the quality requirements of primary industrial raw materials, still need to be separated and purified by wet acid leaching and dissolution, the economic benefits are low.

Based on the above research, there is a need to provide a method of target recycling of waste batteries, said method has a short process, low cost, and can be applied industrially to achieve the target separation of a variety of metals.

CONTENTS OF THE INVENTION

An object of the present invention is to provide a method of targeting recovery of waste batteries, said method induces the solid oxygen in the waste cathode material to transfer directionally by pyrolysis to form a Co and $Al_2O_3$ coexistence environment, which effectively inhibits high temperature alloying, and at the same time, using the high temperature complexation reaction between CO and Co, induces the Co nanoparticles to target agglomeration to form millimeter-sized large particles against the CO concentration gradient, so as to achieve the recovery by magnetic separation and the method described in the present invention is capable of industrial application.

In order to achieve the purpose of this invention, the present invention adopts the following technical solutions:

The present invention provides a method of targeting recovery of waste batteries, said method comprising the following steps:

(1) crushing the positive electrode strip of the waste battery to obtain a crushing product;

(2) Pyrolyzing the crushing product described in step (1) under a CO atmosphere to obtain a pyrolysis product, and then magnetically separating the pyrolysis product to obtain a magnetic separation product to achieve valuable metal recovery;

(3) Passing the pyrolysis gas of the pyrolysis described in step (2) into an alkaline solution to obtain a Li enriched solution, realizing Li recovery.

As the transition metal Co nanoparticles can shuttle and move on the surface and inside the aluminum base material under specific environment, and collide and aggregate into large particles in the CO atmosphere. Further, according to the targeting principle, the present invention proposes to induce the Co nanoparticles generated by pyrolysis of waste lithium battery cathode strips to undergo CO complexation by constructing a CO concentration difference inside and outside of the sample, and to aggregate into millimeter-sized large particles against the movement of the CO concentration gradient, so as to inhibit high-temperature alloying of the mixed metals and to achieve the targeting of the alloys, such as Al, Co, to be separated.

In addition, the present invention makes use of the inherent positive electrode collector of the waste lithium battery as a reducing agent (e.g., Al foil), in situ stimulates the Al foil reduction reaction of the positive electrode material, carries out an aluminothermic reaction rather than a carbothermic reaction, and makes use of the principle of pyrolysis technology to promote the formation of a coexisting environment of Co and $Al_2O_3$ in the interphase of the solid oxygen, thereby effectively inhibiting high-temperature alloying. Specifically, according to the principle of Al—Co—O three-phase equilibrium, it is found that the only stable material phase in which these three elements coexist is $Al_2CoO_4$, which requires a large amount of oxygen to be supported, but the present application is carried out in a CO atmosphere, so stable $Al_2CoO_4$ will not be formed. On the other hand, the atmosphere of the present application will not provide gaseous oxygen, but the material phase of the positive electrode material contains a large amount of solid oxygen, so there is no absolutely oxygen-free environment, and cobalt cannot form pure metal alloys such as AlCo, $Al_5Co_2$, $Al_9Co_2$ and so on. Therefore, the present invention makes use of the characteristics of waste lithium batteries carrying solid oxygen, and achieves the separation of metal phases such as Al and Co through pyrolysis technology, laying a theoretical foundation for the recovery by magnetic separation in the subsequent steps.

The present invention carries out pyrolysis by employing a CO atmosphere, where CO does not provide a reducing effect and only acts as a gas phase complexing agent for the nascent transition metal monomers. Based on the Ellingham diagram of the Gibbs free energy composition of the oxidation reactions of different metals, it can be found that the strong reducing nature of Al allows its oxidation reaction to proceed preferentially, thus robbing oxygen from almost all metal oxides except Mg and Ca. That is, a collector such as an Al foil can reduce a wide range of metals such as nickel cobalt manganese and iron to monomers through replacement reactions. More importantly, the oxygen partial pressure minimum for the C and CO oxidation reactions (~10-20 Pa) is much larger than the oxygen partial pressure demand for the aluminum oxidation (~10-45 Pa), which suggests that the oxygen robbing effect of the aluminothermic reduction reaction is much more effective than that of the carbothermic reduction, proving that the CO atmosphere in the present reaction does not provide a reducing effect, but contributes to the generation of de novo transition metal monomers complexes only.

Preferably, in the CO atmosphere described in step (2), the CO has a gas pressure of 10-800 Pa, for example, it may be 10 Pa, 50 Pa, 100 Pa, 200 Pa, 300 Pa, 400 Pa, 500 Pa, 600 Pa, 700 Pa or 800 Pa, but is not limited to the enumerated values, and other unenumerated values in the numerical range are equally applicable, preferably 100-500 Pa.

Preferably, said CO atmosphere of step (2) is a low-vacuum carbon monoxide atmosphere, said low-vacuum CO atmosphere being formed by passing carbon monoxide at 10-800 Pa under vacuum conditions.

The gas pressure of said CO of the present invention affects the effect of pyrolysis, because CO as a gas complexing agent, if the content is too low, the complexation decreases; if the content of CO is too high, a low vacuum environment cannot be formed, thus affecting the effect of the vacuum pyrolysis, i.e., the said CO atmosphere of the present invention comprises only a small amount of CO gas, ensures the low-vacuum conditions, and employs a low-vacuum CO high-temperature environment for the chemical reaction, which induces the CO-induced nascent cobalt nanoparticles to form $Co(CO)_n$ metal complexes, avoiding the formation of $Al_2CoO_4$ stabilized compounds, and at the same time avoiding the formation of metal alloys without oxygen.

Preferably, the source of CO gas in said CO atmosphere of step (2) comprises pyrolysis gas of biomass.

Preferably, said biomass comprises any one or a combination of at least two of wood chips, domestic waste or garden waste.

Preferably, said reducing agent for pyrolysis of step (2) comprises a collector fluid of said positive electrode strip.

Preferably, said collector fluid is Al foil.

The present invention employs Al foil as the positive electrode collector of the positive electrode strip, so that the Al foil acts as a reducing agent for an aluminothermic reaction to reduce other metals to metal monomers.

Preferably, the complexing agent for the pyrolysis described in step (2) comprises CO.

Preferably, said pyrolysis of step (2) comprises a primary warming to a first temperature, followed by a secondary warming to a second temperature, and finally a cooling.

Preferably, said first temperature is 400-600° C., for example it may be 400° C., 450° C., 500° C., 550° C. or 600° C., and the holding time at the first temperature is 20-40 min, for example it may be 20 min, 30 min or 40 min, but is not limited to the enumerated values, and other unenumerated values within the numerical range are equally applicable.

Preferably, said heating rate of said primary heating is 15-25° C./min, for example it may be 15° C./min, 20° C./min or 25° C./min, but is not limited to the values listed, other values not listed in the numerical range are equally applicable.

Preferably, said second temperature is 700-900° C., for example, it can be 700° C., 800° C. or 900° C., and the holding time at the second temperature is 50-70 min, for example, it can be 50 min, 60 min or 70 min, but not limited to the values listed, other values not listed in the value range are equally applicable.

Preferably, said rate of warming of said secondary warming is 5-15° C./min, for example it may be 5° C./min, 8° C./min, 10° C./min or 15° C./min, but is not limited to the values listed, other values not listed in the numerical range are equally applicable.

Preferably, said cooling to 20-35° C., for example, may be 23° C., 25° C., 30° C. or 35° C., but is not limited to the values listed, other values not listed in the numerical range are equally applicable.

Preferably, the magnetic separation product described in step (2) comprises magnetically selected cobalt powder and non-magnetically selected lithium aluminates. Preferably, said alkaline solution of step (3) comprises a $CaOH_2$ solution.

Preferably, the concentration of Li in said Li rich solution of step (3) is 5-10 g/L, for example, it may be 5 g/L, 7.5 g/L, 9.5 g/L or 10 g/L, but is not limited to the listed values, other unlisted values within the numerical range are equally applicable.

Preferably, the used battery described in step (1) is first physically short-circuited and discharged, then immersed in a salt solution and discharged, and finally dried and disassembled to obtain the positive electrode strip.

Preferably, the manner of crushing described in step (1) comprises shear crushing.

Preferably, the waste battery described in step (1) comprises a waste lithium cobalt acid battery.

As a preferred technical solution of the present invention, said method comprises the following steps:

(1) physically short-circuiting and discharging the waste battery, then discharging it by immersing it in a salt solution, and finally drying and disassembling it to obtain a positive electrode strip, and shearing and crushing said positive electrode strip to obtain a crushing product;

(2) under vacuum conditions, pass 10-800 Pa of CO to form a low vacuum CO atmosphere, under said low vacuum CO atmosphere, the crushing product described in step (1) is once heated up to 400-600° C. at a heating rate of 15-25° C./min, and after holding for 20-40 min, it is then heated up to 700-900° C. at a heating rate of 5-15° C./min for a second time. After holding the temperature for 50-70 min, reduce the temperature to 20-35° C., complete the pyrolysis, and obtain the pyrolysis product;

(3) magnetically selecting the pyrolysis product described in step (2) to obtain magnetically selected cobalt powder and non-magnetically selected lithium aluminate;

(4) Passing the pyrolysis gas of the pyrolysis described in step (2) into a $CaOH_2$ solution to obtain a Li rich solution with a Li concentration of 5-10 g/L.

Relative to the prior art, the present invention has the following beneficial effects:

By adopting CO atmosphere pyrolysis, the present invention constructs a CO concentration difference inside and outside the sample, induces the nanoparticles generated by pyrolysis of waste lithium battery positive electrode strips to undergo CO complexation and move against the CO concentration gradient to aggregate into millimeter-sized large particles, thus inhibiting the high temperature alloying of the mixed metals and realizing the target separation of alloys such as Al, Co, etc., and the method described in the present invention is capable of being applied in an industrialized manner.

DESCRIPTION OF THE ACCOMPANYING DRAWINGS

SPECIFIC EMBODIMENTS

The technical embodiments of the present invention are further described below by way of specific embodiments. It should be clear to those skilled in the art that the described embodiments are merely to aid in the understanding of the present invention and should not be regarded as a specific limitation of the present invention.

Embodiment 1

Figure 1:
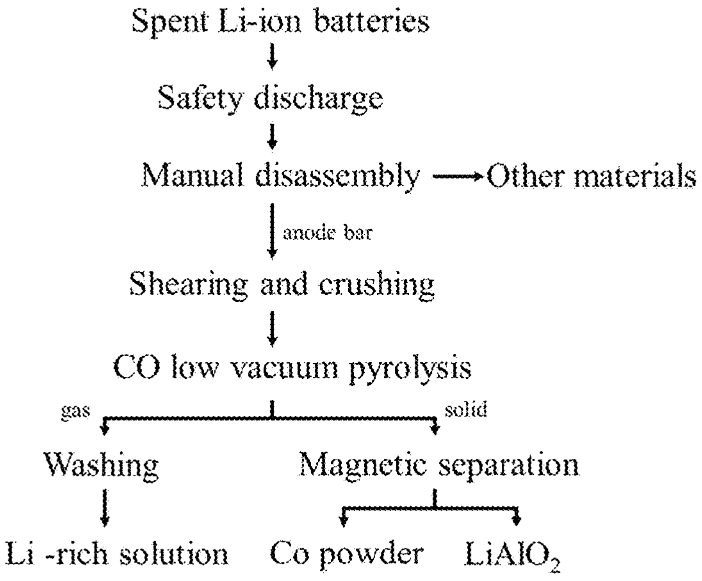
FIG. 1 shows a flow chart of the method described in Example 1 of the present invention.
Figure 2:
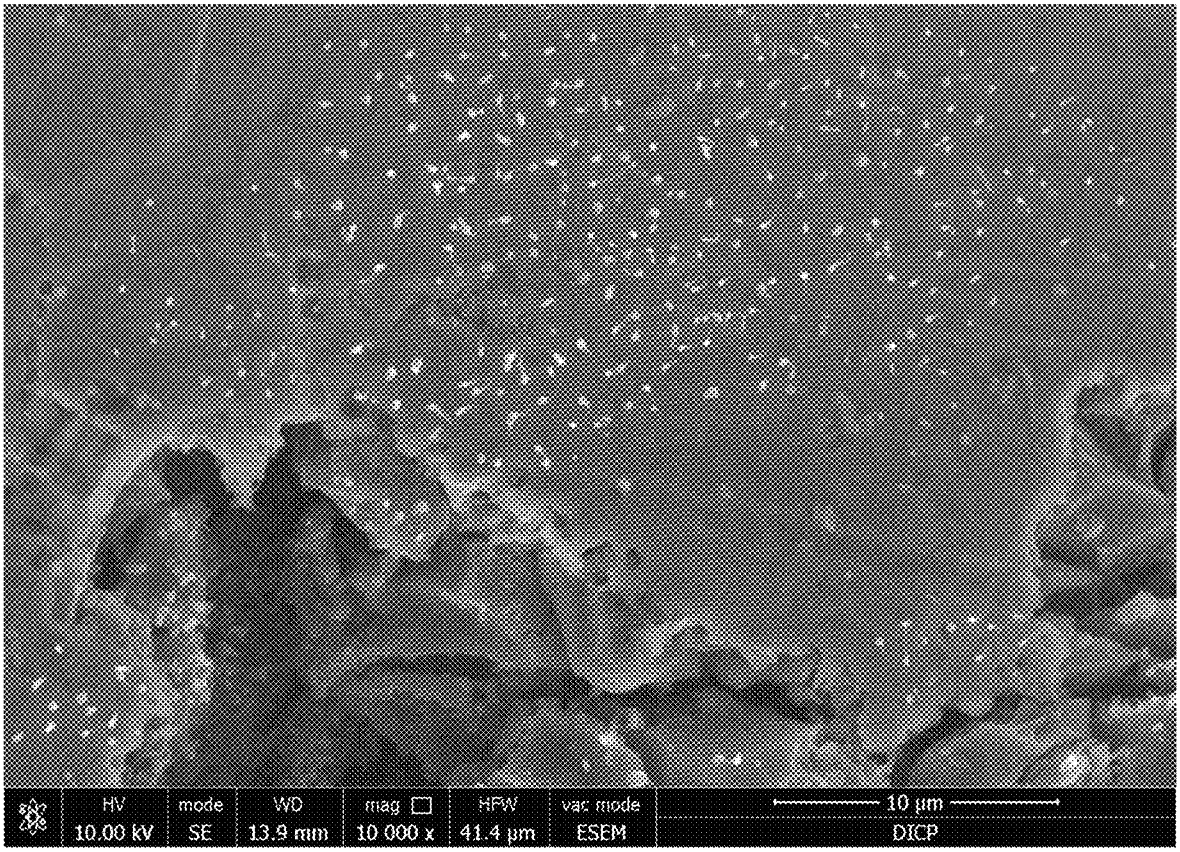
FIG. 2 shows a scanning electron micrograph of the movement of Co metal nanoparticles during the pyrolysis process described in Example 1 of the present invention.
Figure 3:
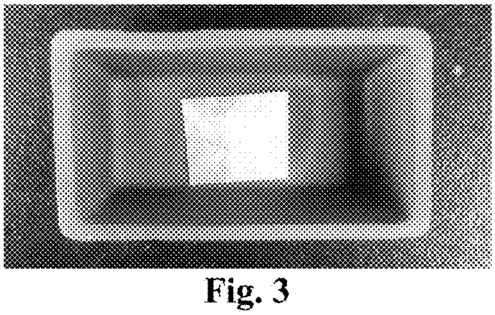
FIG. 3 shows an optical effect diagram of the positive electrode strip before pyrolysis as described in Example 1 of the present invention.
Figure 4:
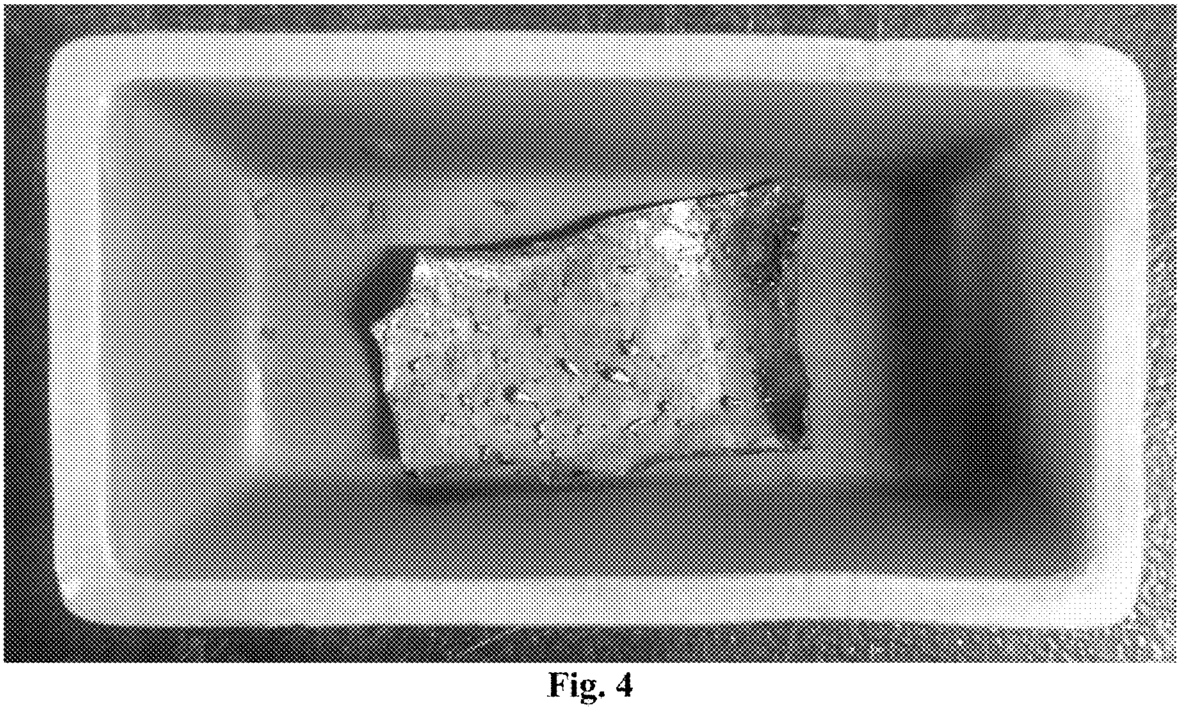
FIG. 4 shows an optical effect diagram of the targeted aggregation of Co metal nanoparticles after the pyrolysis described in Example 1 of the present invention.

This embodiment provides a method of targeting recycling of used batteries, a flow chart of said method is shown in FIG. 1, comprising the following steps:

(1) In order to ensure the safety of the experimental process, the waste Li batteries are safely discharged, specifically 100 blocks of about 2.5 kg of waste Li Coate mobile phone Li batteries are first discharged by a physical short circuit for 12 hours, and then immersed in a 5% NaCl salt solution to be fully discharged for 48 hours, and then left to air dry in a fume cupboard for 48 hours;

(2) The discharged lump waste Li batteries were disassembled manually in a fume hood, and 100 waste positive electrode strips were removed;

(3) The discharged waste Li battery cathode strips were sheared and crushed to obtain 1600 g of crushed product;

(4) under vacuum conditions, pass 200 Pa of CO to form a low vacuum CO atmosphere, in the pyrolysis furnace under said low vacuum CO atmosphere, the crushing product described in step (3) is heated up to 500° C. once at a heating rate of 20° C./min, after holding for 30 min, and then heated up to 800° C. twice at a heating rate of 10° C./min, after holding for 60 min spontaneous combustion cooling to 25° C., completing the low vacuum pyrolysis of CO, and obtaining a pyrolysis product;

(5) magnetically selecting the pyrolysis product described in step (4) to obtain magnetically selected Co powder and non-magnetically selected $LiAlO_2$;

(6) Passing the pyrolysis gas of the pyrolysis described in step (4) into a 1 mol/L calcium hydroxide solution to obtain a Li-rich solution, said Li-rich solution being a LiOH-rich solution;

The scanning electron microscope diagram of the movement of the Co metal nanoparticles during the pyrolysis process described in the present invention is shown in FIG. 2, the optical effect diagram of the anode strip before said pyrolysis is shown in FIG. 3, and the optical effect diagram of the targeted aggregation of the Co metal nanoparticles after the pyrolysis is shown in FIG. 4.

The present invention has carried out a number of parallel experiments on Example 1 as follows:

(1) Laboratory targeted pyrolysis experiment Group A: the recovery rate of Co in the Co powder product was 96.8%, the purity of the Co powder was 98.4%, the product purity of the $LiAlO_2$ product was 95.5%, and the concentration of Li in the Li-rich solution was 6.3 g/L;

(2) Laboratory targeted pyrolysis experiment Group B: the recovery rate of Co in Co powder products was 97.5%, the purity of Co powder was 99.0%, the product purity of $LiAlO_2$ products was 95.6%, and the concentration of Li in Li-rich solution was 5.8 g/L;

(3) Laboratory targeted pyrolysis experiment Group C: the recovery rate of Co in Co powder products was 98.3%, the purity of Co powder was 97.2%, the product purity of $LiAlO_2$ products was 94.1%, and the concentration of Li in Li-rich solution was 7.1 g/L;

(4) Laboratory targeted pyrolysis experiment Group D: the recovery rate of Co in Co powder products is 94.8%, the purity of Co powder is 98.8%, the product purity of $LiAlO_2$ products is 97.5%, and the concentration of Li in Li-rich solution is 8.3 g/L;

(5) Industrialized targeted pyrolysis pilot experiment Group A: the recovery rate of Co in Co powder products is 92.4%, the purity of Co powder is 94.7%, the product purity of $LiAlO_2$ products is 93.7%, and the concentration of Li in Li-rich solution is 5.5 g/L;

(6) Industrialized targeted pyrolysis pilot experiment Group A: the recovery rate of Co in Co powder products was 91.9%, the purity of Co powder was 95.2%, the product purity of AlLiO2 products was 96.5%, and the concentration of Li in Li-rich solution was 3.9 g/L;

(7) Industrialized targeted pyrolysis pilot experiment Group A: the recovery rate of Co in Co powder products was 94.8%, the purity of Co powder was 95.8%, the product purity of $LiAlO_2$ products was 92.7%, and the concentration of Li in Li-rich solution was 7.1 g/L;

(8) Industrialized targeted pyrolysis pilot experiment Group A: the recovery rate of Co in the Co powder product was 93.3%, the purity of Co powder was 96.7%, the product purity of $LiAlO_2$ product was 95.5%, and the concentration of Li in the Li-rich solution was 5.5 g/L.

The above results show that the method described in the present invention has excellent recovery effect, and the stability of the recovery effect is high, and it is also capable of industrial application.

Example 2

This embodiment provides a method of targeting recovery of waste batteries, said method comprising the following steps:

(1) In order to ensure the safety of the experimental process, 100 blocks of about 2.5 kg of waste Li Coate mobile phone Li batteries are first discharged by a physical short circuit for 12 hours, and then immersed in a 5% NaCl salt solution to be fully discharged for 48 hours, and then air-dried in a fume hood for 48 hours;

(2) The discharged lump waste Li batteries were disassembled manually in a fume hood, and 100 waste positive electrode strips were removed;

(3) The discharged waste Li battery cathode strips were sheared and crushed to obtain 1600 g of crushed product;

(4) under vacuum conditions, pass 200 Pa of CO to form a low vacuum CO atmosphere, in the pyrolysis furnace under said low vacuum CO atmosphere, the crushing product described in step (3) is heated up to 400° C. at a heating rate of 15° C./min once, held for 40 min, and then heated up to 900° C. at a heating rate of 15° C./min for a second time, and then held for 50 min spontaneous combustion cooling to 35° C., completing the pyrolysis, and obtaining the pyrolysis product;

(5) magnetically selecting the pyrolysis product described in step (4) to obtain magnetically selected Co powder and non-magnetically selected $LiAlO_2$;

(6) passing the pyrolysis gas of the pyrolysis described in step (4) into a 1 mol/L calcium hydroxide solution to obtain a Li-rich solution, said Li-rich solution being a Li hydroxide-rich solution.

Embodiment 3

This embodiment provides a method of targeting recycling of waste batteries, said method comprising the following steps:

(1) In order to ensure the safety of the experimental process, 100 blocks of about 2.5 kg of waste Li Coate mobile phone Li batteries are first discharged by physical short circuit for 12 hours, and then immersed in a 5% NaCl salt solution to be fully discharged for 48 hours, and then air-dried in a fume hood for 48 hours;

(2) The discharged lump waste Li batteries were disassembled manually in a fume hood, and 100 waste positive electrode strips were removed;

(3) The discharged waste Li battery cathode strips were sheared and crushed to obtain 1600 g of crushed product;

(4) under vacuum conditions, pass 200 Pa of CO to form a low vacuum CO atmosphere, in the pyrolysis furnace under said low vacuum CO atmosphere, the crushing product described in step (3) is heated up to 600° C. once at a heating rate of 25° C./min, held for 20 min, then heated up to 700° C. for the second time at a heating rate of 5° C./min, and then held for 70 min spontaneous combustion cooling to 20° C., completing the pyrolysis, and obtaining the pyrolysis product;

(5) magnetically selecting the pyrolysis product described in step (4) to obtain magnetically selected Co powder and non-magnetically selected $LiAlO_2$;

(6) Passing the pyrolysis gas of the pyrolysis described in step (4) into a 1 mol/L calcium hydroxide solution to obtain a Li-rich solution, said Li-rich solution being a LiOH-rich solution.

Embodiment 4

This embodiment provides a method of targeted recycling of used batteries, said method being the same as embodiment 1 except that step (4) is passed into 10 Pa of CO.

Embodiment 5

The present embodiment provides a method of targeted recycling of used batteries, said method being the same as embodiment 1 except that step (4) is passed into 100 Pa of CO.

Embodiment 6

The present embodiment provides a method of targeted recycling of used batteries, said method being the same as embodiment 1 except that step (4) passes through 500 Pa of CO.

Embodiment 7

The present embodiment provides a method of targeted recycling of used batteries, said method being the same as embodiment 1 except that step (4) passes through 800 Pa of CO.

Embodiment 8

The present embodiment provides a method of targeted recycling of used batteries, said method being the same as Example 1 except that step (4) passes through 1000 Pa of CO.

Comparative Example 1

The present contrasting proportion provides a method of targeted recycling of used batteries, said method being the same as Example 1 except that step (4) is passed into 200 Pa of carbon dioxide.

Comparative Ratio 2

The present contrasting ratio provides a method of targeted recycling of waste batteries, said method is the same as Example 1 except that step (4) is passed into 200 Pa of nitrogen.

The recovery efficiency of Co in the Co powder product obtained from the above embodiments and the relative proportion, the purity of the Co powder, the purity of the $LiAlO_2$, and the concentration of Li in the Li-rich solution are shown in the following table:

TABLE 1

| | Recovery of Co (%) | Purity of Co powder (%) | Purity of $LiAlO_2$ (%) | Concentration of Li in Li-rich solution (g/L) |
|---|---|---|---|---|
| Example 1 | 96.33 | 98.52 | 95.84 | 9.87 |
| Example 2 | 95.78 | 95.21 | 94.75 | 8.85 |
| Example 3 | 95.24 | 94.79 | 93.58 | 8.56 |
| Example 4 | 93.05 | 96.89 | 93.23 | 8.45 |
| Example 5 | 94.86 | 97.14 | 94.87 | 9.54 |
| Example 6 | 94.88 | 97.84 | 95.45 | 9.41 |
| Example 7 | 93.28 | 96.77 | 93.28 | 8.05 |
| Example 8 | 88.75 | 75.84 | 78.92 | 3.28 |
| Contrast ratio 1 | 75.88 | 69.94 | 75.42 | 4.21 |
| Contrast ratio 2 | 64.43 | 53.81 | 56.87 | 3.75 |

As can be seen from Table 1:

As can be seen from Example 1 with counterparts 1-2, the CO atmosphere of the present invention is capable of effectively recovering metal Co powder and LiAlO2, which, combined with FIGS. 2-4, can demonstrate that the pyrolysis of the present invention is capable of inducing the Co nanoparticles to form millimeter-sized particles by targeting aggregation against the CO concentration gradient; as can be seen in Example 1 with Examples 4-8, the gas pressure of CO in the low-vacuum CO atmosphere of the present invention affects the effect of the pyrolysis and thus affect the recovery effect.

In summary, the present invention provides a method of targeting recovery of waste batteries, said method induces the solid oxygen in the waste cathode material to transfer directionally through pyrolysis to form a Co and $Al_2O_3$ coexistence environment, which effectively inhibits high temperature alloying, and at the same time, utilizes the high temperature complexation reaction between CO and nascent cobalt induce cobalt nanoparticles to target aggregation to form millimeter-sized large particles in reverse of the CO concentration gradient, thereby realizing magnetic separation and recovery.

The above description is only a specific embodiment of the present invention, but the scope of protection of the present invention is not limited thereto, and technicians in the technical field should understand that any changes or substitutions that can be readily thought of by technicians in the technical field within the technical scope of the disclosure of the present invention fall within the scope of protection and disclosure of the present invention.

The invention claimed is:

1. A method of targeted recycling of waste batteries, characterized in that said method comprises the following steps:

(1) physically short-circuiting and discharging a waste battery, then discharging it by immersing it in a salt solution, and finally drying and disassembling it to obtain a positive electrode strip, and shearing and crushing the positive electrode strip of the waste battery to obtain a crushing product;

(2) pyrolyzing the crushing product described in step (1) under a CO atmosphere to obtain a pyrolysis product, wherein the CO atmosphere is formed under vacuum conditions by passing in CO at a gas pressure of 10-800 Pa, and wherein the pyrolyzing comprises heating the crushing product primarily to a temperature of 400-600° C. at a heating rate of 15-25° C./min, holding the temperature for 20-40 min, then secondarily heating at a heating rate of 5-15° C./min to a temperature of 700-900° C., holding the temperature for 50-70 min, and then cooling to a temperature of 20-35° C.;

(3) magnetically selecting the pyrolysis product described in step (2) to obtain magnetically selected Co powder and non-magnetically selected $LiAlO_2$ to realize valuable metal recovery;

(4) passing the pyrolysis gas of the pyrolysis described in step (2) into a $Ca(OH)_2$ solution to obtain a Li-rich solution having a Li concentration of 5-10 g/L, realizing Li recovery.

2. The method according to claim 1, characterized in that in the CO atmosphere referred to in step (2), the gas pressure of the CO is 100-500 Pa; wherein the source of CO gas in said CO atmosphere of step (2) comprises pyrolysis gas of biomass.

3. The method according to claim 2, wherein the biomass comprises any one or a combination of at least two of wood chips, domestic waste, or garden waste.

4. The method according to claim 1, characterized in that a reducing agent for pyrolysis said in step (2) comprises a collector fluid of said positive electrode strip; wherein the collector fluid is Al foil; wherein a complexing agent for pyrolysis of step (2) comprises CO.

5. The method according to claim 4, wherein the Al foil reduces cobalt to a cobalt monomer by an aluminothermic reaction.

6. The method according to claim 1, characterized in that the waste battery described in step (1) comprises a waste lithium cobaltate battery.

7. The method according to claim 1, wherein the Li-rich solution comprises a lithium hydroxide solution.

8. The method according to claim 1, wherein the salt solution comprises a sodium chloride solution.

* * * * *